(12) United States Patent
Ichikawa et al.

(10) Patent No.: US 6,484,229 B1  
(45) Date of Patent: Nov. 19, 2002

(54) MAGNETIC DISK APPARATUS

(75) Inventors: Masatoshi Ichikawa, Yokohama (JP); Kiyoshi Honda, Yokohama (JP); Naoto Matsunami, Yokohama (JP); Hideki Kamimaki, Fujisawa (JP); Osamu Kunisaki, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/518,688

(22) Filed: Mar. 3, 2000

(30) Foreign Application Priority Data

Mar. 5, 1999 (JP) .......................................... 11-058070

(51) Int. Cl.$^7$ .............................................. G06F 12/00
(52) U.S. Cl. ............................ 711/4; 711/152; 710/126
(58) Field of Search ...................... 711/4, 152; 710/126

(56) References Cited

U.S. PATENT DOCUMENTS

| | | | | |
|---|---|---|---|---|
| 5,239,632 A | * | 8/1993 | Larner .......................... | 710/126 |
| 6,209,023 B1 | * | 3/2001 | Dimitroff et al. ........... | 709/211 |
| 6,260,120 B1 | * | 7/2001 | Blumenau et al. .......... | 711/152 |
| 6,263,445 B1 | * | 7/2001 | Blumenau .................... | 713/201 |

FOREIGN PATENT DOCUMENTS

| | | |
|---|---|---|
| JP | 6-44181 | 2/1994 |
| JP | 9-62452 | 3/1997 |

* cited by examiner

*Primary Examiner*—Do Hyun Yoo  
*Assistant Examiner*—Mehdi Namazi  
(74) *Attorney, Agent, or Firm*—Mattingly, Stanger & Malur, P.C.

(57) ABSTRACT

A disk storage apparatus includes a logical unit number correspondence memory for storing the correspondence and the logical unit number designated by a host computer and the logical unit number of the disk storage apparatus, a logical unit number conversion program for converting the logical unit number designated by the host computer to the logical unit number of the disk storage apparatus, and a logical unit correspondence setting program for storing the correspondence of the logical unit number designated by the host computer to the logical unit number of the disk storage in the logical unit number correspondence memory thereby, a plurality of host computers sharing at least one disk storage apparatus.

13 Claims, 9 Drawing Sheets

FIG.6

| BYTE \ BIT | 7 | 6 | 5 | 4 | 3 | 2 | 1 | 0 | |
|---|---|---|---|---|---|---|---|---|---|
| 0 | RESERVED 0 | 0 | 1 | PAGE CODE 0 | 0 | 0 | 1 | 1 | ~601 |
| 1 | PAGE LENGTH ||||||||~602 |
| 2 | PORT NUMBER ||||||||~607 |
| 3 | RESERVED ||||||||  |
| 4-7 | WWN302 ||||||||  |
| 4+8n | DEDICATED LOGICAL UNIT NUMBER ||||||||~603 |
| 5+8n | PHARED LOGICAL UNIT NUMBER ||||||||~604 |
| 6+8n - 5+8(n+1) | DEDICATED LOGICAL UNIT NUMBER ||||||||~605 |
| 5+8(n+m) - 5+8(n+m+1) | SHARED LOGICAL UNIT NUMBER ||||||||~606 |

FIG.7

| BIT / BYTE | 7 | 6 | 5 | 4 | 3 | 2 | 1 | 0 | |
|---|---|---|---|---|---|---|---|---|---|
| 0 | RESERVED 0 | 0 | PAGE CODE 1 | 0 | 0 | 0 | 1 | 1 | ~601 |
| 1 | 0x26 ||||||||  ~602 |
| 2 | 0x02 ||||||||  ~607 |
| 3 | RESERVED ||||||||  |
| 4-11 | WWN302a ||||||||  |
| 12 | 0x02 ||||||||  ~603 |
| 13 | 0x01 ||||||||  ~604 |
| 14-21 | 0x00 ||||||||  ~605a |
| 22-29 | 0x01 ||||||||  ~605b |
| 30-37 | 0x02 ||||||||  ~606 |

MAGNETIC DISK APPARATUS

BACKGROUND OF THE INVENTION

1. Field of the Invention

This invention relates to a control system of logical units present in a disk storage apparatus, and to a computer system comprising the disk storage apparatus and one or a plurality of host computers.

2. Description of the Related Art

A computer system, in which one or a plurality of disk storage apparatuses having a plurality of logical units are connected to a plurality of host computers through high-speed interfaces such as a Fibre Channel and these host computers share one or a plurality of disk storage apparatuses, is known. However, there is a strong demand in such a computer system for storing information inherent to each host computer, such as an OS, in the disk storage apparatus having a high-speed interface, such as a Fibre Channel, and shared by a plurality of host computers, rather than in a disk storage apparatus having an ATA (Advanced Technology Attachment) or SCSI (Small Computer System Interface) interface and connected discretely to each host computer, from the aspects of high-speed performance and cost. In order to store the information inherent to each host computer in the disk storage apparatus shared by a plurality of host computers, it is essentially necessary to control exclusively the logical unit, that stores the information inherent to each host computer, as the logical unit dedicated to the individual host computer.

When a plurality of host computers and one or a plurality of disk storage apparatuses are connected by the Fibre Channel, the physical interface is generally the Fibre Channel and the logical interface is generally the SCSI.

In the SCSI, a Reserve/Release command and a Persistent Reserve In/Out command are stipulated as the commands for exclusively managing the logical units. However, to manage exclusively the logical unit dedicated to each host computer for other host computers in these SCSI commands, the following problems are yet to be solved.

In the Reserve/Release command, the Reserve condition of the logical unit is released if the power source of the disk storage apparatus is cut off or the disk storage apparatus is reset. Therefore, the logical unit dedicated to each host computer cannot be managed exclusively at the time of making of the power source.

In the Persistent Reserve In/Out command, the Persistent Reserve condition is not released even when the power source of the disk storage apparatus is cut off or the disk storage apparatus is reset. However, because other host computer holding a Reservation Key can change the Persistent Reserve condition, the logical unit dedicated to each host computer cannot completely be managed exclusively.

To manage exclusively the logical unit dedicated to each host computer, a mechanism becomes necessary that exclusively manages the logical unit inside the disk storage apparatus without relying on exclusive management by the SCSI command.

Conventional control systems of the logical units of the disk storage apparatuses are described in "SCSI Bus System" (JP-A-6-44181) and "Conversion Method of Block Address and Control Method of Rotary Type Storage Sub-System" (JP-A-9-62452), for example. When this control system is constituted by the conventional disk storage apparatus, there is no other means at present than the method using Reserve/Release command or the Persistent Reserve In/Out command of the SCSI in order to exclusively manage the logical units. Therefore, it has not been possible to completely manage exclusively the logical unit dedicated to each host computer.

On the other hand, in the conventional disk storage apparatuses and host computers, the logical disk number that is assigned for managing the logical disk inside the disk storage apparatus is coincident with the logical disk number assigned for managing the logical disk inside the host computer. If the host computer designates the same logical unit number, therefore, access is made to the same logical unit inside the disk storage apparatus when all the host computers gain access to this logical unit.

When the host computer and the disk storage apparatus are connected mutually through the interface, the host computer designates serially the logical unit numbers from 0 to each disk storage apparatus at the time of making of the power source, sends the Inquiry command of the SCSI and recognizes the disk storage apparatus and the logical unit inside the disk storage apparatus. Generally, the host computer keeps sending the Inquiry command serially from the logical unit number 0 until it detects from the response of the Inquiry command that the logical unit in the designated disk storage apparatus does not exist. Therefore, the serial numbers are allotted to the logical units inside the host computer, and the logical units are so managed.

In such a computer system, there is a strong demand for storing a shared application and data, that are used in the computer system, in the disk storage apparatus that has a high-speed interface such as the Fibre Channel and is shared by a plurality of host computers, from the aspects of maintenance and the cost. Generally, the conventional disk storage apparatuses incorporate the logical unit having the number 0.

SUMMARY OF THE INVENTION

In a computer system in which a plurality of host computers share one or a plurality of disk storage apparatuses, an object of the present invention is that it proposes an internal mechanism of a disk storage apparatus that exclusively manages its logical units for the host computers without using an SCSI command for exclusive management.

The disk storage apparatus includes a hard disk drive and a disk array. The hard disk drive comprises a disk control portion and a disk drive. The disk control portion comprises a host interface control portion, a host management portion, a logical unit management portion, an address conversion portion, a command processing portion, a drive cache, a drive cache control portion, a drive control portion and a data bus.

The disk array has a mechanism that achieves high performance and high reliability of the disk system. To attain high-speed performance, a physical hard disk drive is allowed to function apparently as one hard disk drive for the host computer in the disk array. To attain high reliability, on the other hand, redundant data for data recovery is stored in other hard disk drive if any trouble occurs in the hard disk drive that stores the data.

The disk array comprises one or a plurality of disk array controllers and a plurality of hard disk drives. Fibre Channel, SCSI, and so forth are used as the interface between the disk array controller and a plurality of hard disk drives. Each disk array controller comprises a host interface control portion, a host management portion, a logical unit management portion, an address conversion portion, a command processing portion, a drive interface control portion, a drive cache and a drive cache control portion.

In order to achieve the object of the present invention, in a computer system in which a plurality of host computers and one or a plurality of disk storage apparatuses having a plurality of logical units are connected to one another by the Fibre Channel as the physical interface and by SCSI as the logical interface in FC-AL (Fibre Channel Arbitrated Loop) topology, a disk storage apparatus according to the present invention includes a logical unit correspondence memory portion for storing the correspondence between the logical unit number allotted by and in the host computer and the logical unit number allotted by and in the disk storage apparatus, and a logical unit number conversion portion for converting the logical unit number designated by the corresponding host computer through the SCSI command by using the logical unit correspondence memory portion to the logical unit number in the disk storage apparatus, both portions being provided to the logical unit management portion of the disk storage apparatus. The logical unit management memory portion includes a logical unit correspondence setting portion for setting the correspondence between the logical unit number allotted by and in the host computer and the logical unit number allotted by and in the disk storage apparatus.

The function of the disk control portion of the hard disk drive and its operation will be explained. The host interface control portion controls the FC-AL signals and the protocol, and executes the Link control with the host computers, the address management on the loop of the hard disk drive, the SCSI command reception, the data flow control, and the response transmission to the SCSI command. The host management portion stores and manages the communication environment information inherent between the Fibre Channel Ports of the host computer and the disk storage apparatus using Word Wide Names (WWN) that is the inherent address to the Fibre Channel port of the host computer.

The logical unit management portion manages the physical position and the capacity of each logical unit of the hard disk drive. It also manages exclusively the logical units for the host computers. To execute this exclusive management, the logical unit number conversion means converts the logical unit number designated by the SCSI command to the logical unit number inside the hard disk drive.

The address conversion portion converts the logical block address (LBA) designated by the SCSI command to the physical position of the disk drive.

The data bus is an internal bus for executing the data transfer between the host interface and the disk drive.

The command processing unit interprets the SCSI command received from the host computer and controls its execution.

The drive cache is a temporary memory for absorbing the difference of the data transfer rate between the host interface and the disk drive, and is managed by the cache management portion.

The drive control portion manages the format of the disk drive and controls data write/read to and from the disk drive.

Next, the function of the disk array controller and its operation will be explained. The portions other than the address conversion portion and the drive interface portion have the same functions as those of the corresponding disk control portion of the hard disk drive. The explanation will be given hereby on the address conversion portion and the drive interface control portion.

The address conversion portion converts the request of the SCSI command transmitted by the host computer to the SCSI command for the hard disk drive inside the disk array.

The drive interface control portion controls the interface between the disk array controller and the hard disk drive inside the disk array, transmits the command, that is converted and generated by the address conversion portion, to the hard disk drive, and controls thus the data flow between the disk array controller and the hard disk drive.

The logical unit number correspondence setting means, that is provided afresh in the present invention, associates on the 1:1 basis the number, that is allotted inside the disk storage apparatus to the logical unit dedicated to each host computer, with the logical unit number allotted inside the corresponding host computer, and sets the correspondence relation to the logical unit correspondence memory means. On the other hand, this correspondence setting means associates the number allotted inside the disk storage apparatus to the logical unit, shared by a plurality of host computers, with the logical unit numbers allotted by and in a plurality of host computers, and sets this correspondence relation to the logical unit correspondence memory means.

The logical unit number conversion means converts the logical unit number, that is designated by the host computer for each command by using the WWN inherent to each Fibre Channel Port of the host computer and the logical unit correspondence memory means to the logical unit number allotted inside the disk storage apparatus. Therefore, the logical unit management portion using the logical unit number conversion means can manage exclusively the logical unit, that is useful for each host computer, for other host computers. When the logical unit correspondence memory means, the logical unit correspondence setting means and the logical unit number conversion means according to the present invention are employed, the logical unit storing the information inherent to each host computer can be managed exclusively without using the SCSI command for exclusive management.

BRIEF DESCRIPTION OF THE DRAWINGS

FIG. 6 shows a page format of a parameter page for notifying the number allotted by a host computer to a logical unit by a Mode Select command;

FIG. 7 shows the values of the page parameters transmitted to a disk storage device by the Mode Select command in order for a host computer to notify the number allotted to the logical unit;

DESCRIPTION OF THE EMBODIMENTS

Figure 2:
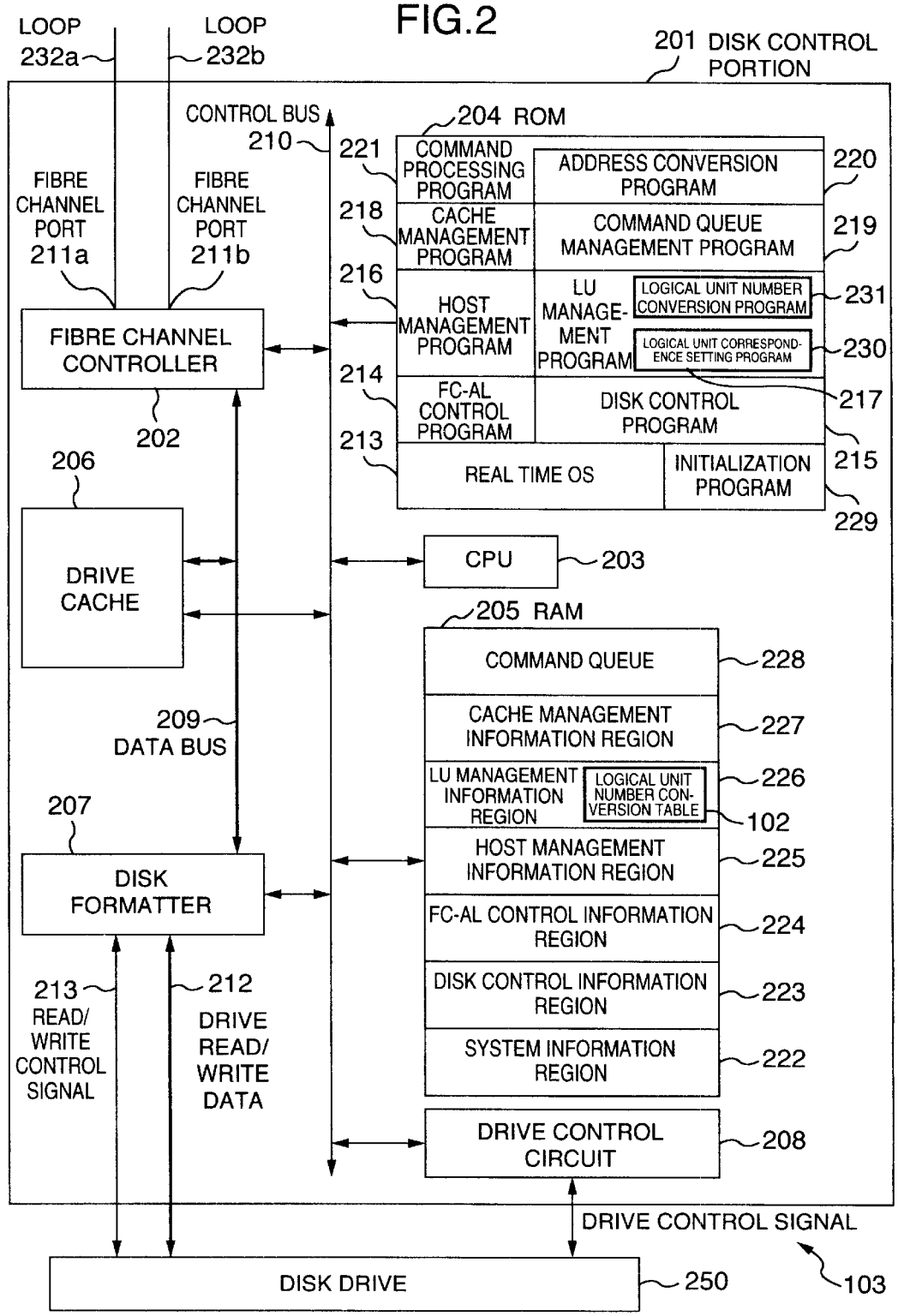
FIG. 2 shows the structure of a disk control portion in the first embodiment of the present invention.
Figure 3:
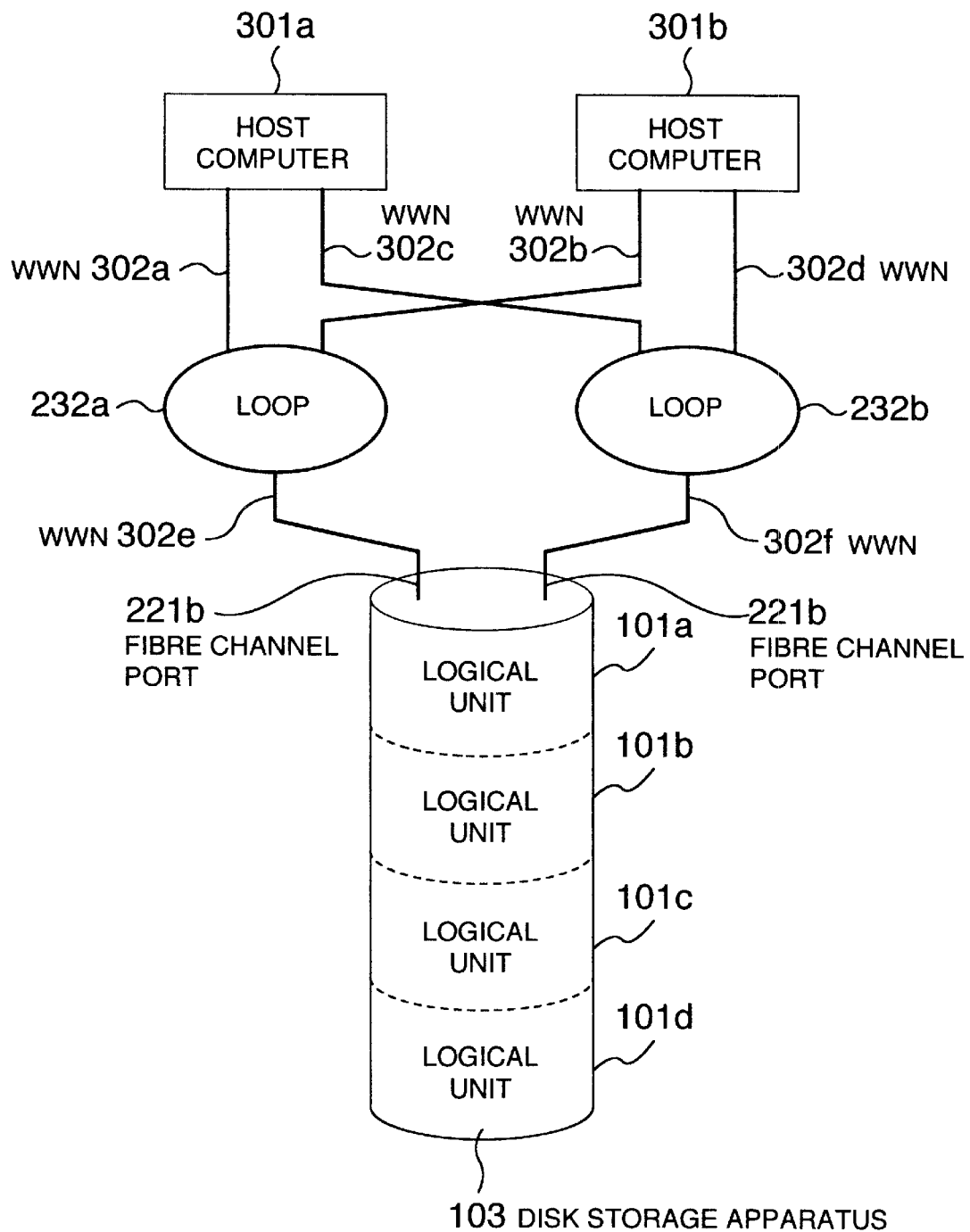
FIG. 3 is a structural view of a computer system comprising host computers and a disk storage apparatus according to the first embodiment of the present invention.

The first embodiment of the present invention will be explained with reference to FIGS. 1 to 7. This embodiment represents the application of the present invention to a hard disk drive. FIG. 3 shows a system construction of a computer system comprising host computers and a disk storage apparatus according to the present invention. Two host computers 301a and 301b and a disk storage apparatus 103 are connected through a physical interface of a Fibre Channel and a logical interface of an SCSI. Loop topology called "FC-AL" is used for the connection. The SCSI command is transmitted as a frame of FC-AL from either one of the host computers 301a and 301b to the disk storage apparatus 103. Two loops, that is, Loop 232a and Loop 232b, exist between the host computers 301a and 301b and the disk storage apparatus 103. The host computer 301a has two Fibre Channel Ports whose WWN (World-Wide Names) are WWN 302a and WWN 302c. Numerals 302a to 302d are inherent values for identifying the respective Fibre Channel Ports. The Fibre Channel Port having WWN 302a is connected to the Loop 232a and the Fibre Channel Port having WWN 302c is connected to the Loop 232b. The host computer 301b has two Fibre Channel Ports whose WWN are WWN 302b and WWN 302d. The Fibre Channel Port having WWN 302b is connected to the Loop 232a and the Fibre Channel Port having WWN 302d is connected to the Loop 232b.

The disk storage apparatus 103 in this embodiment is the hard disk drive. The hard disk drive 103 has two independent Fibre Channel Ports 211a and 211b, which are connected to the Loop 235a and Loop 235b, respectively.

The hard disk drive 103 comprises a hard disk control portion 201 and a disk drive 250. FIG. 2 is a structural view of the disk control portion in the first embodiment.

The disk control portion 201 comprises a Fibre Channel controller 202, a CPU 203, a ROM 204, a RAM 205, a drive cache 206, a disk formatter 207, a drive control circuit 208, a data bus 209 and a control bus 210.

The Fibre Channel controller 202 is a hardware that controls the FC-AL signals and a protocol and executes link control with the host computers and frame transmission/reception. The CPU 203 reads out and executes the program stored in the ROM 204 by using the control bus 210, controls each constituent members of the disk control portion 201 and thus controls collectively the control unit 201. The CPU 203 stores temporary control information during the execution of the program in the RAM 205 and looks up the RAM 205. In this embodiment, the ROM 204 is a flash memory having a capacity of 512 KB and the RAM 205 is a DRAM having a capacity of 256 KB.

The drive cache 206 is a DRAM having a capacity of 2 MB and is a temporary buffer for absorbing the difference of a data transfer rate between the FC-AL (Fibre Channel Arbitrated Loop) and the disk drive 250.

The disk formatter 207 is a hardware that manages the physical format storing the data of the disk drive 250 and controls data read/write of the disk drive 250. It inputs and outputs drive read/write data 212 and read/write control signal 213.

The data bus 209 executes data transfer between the Fibre Channel controller 202 and the drive cache 206 and between the disk formatter 207 and the drive cache 206.

The drive control circuit 208 is a hardware that controls an actuator for positioning the head position of the disk drive 250 and a spindle motor for executing constant rotation control of a medium disk, and inputs and outputs the drive control signals such as a head positioning control signal and a signal for controlling the spindle motor for rotating the medium disk.

Next, the program stored in the ROM 204 and the RAM 205 will be explained.

The program stored in the ROM 204 comprises a real time OS 213, an FC-AL control program 214, a disk control program 215, an LU (Logical Unit) management program 217, a command queue management program 219, a cache management program 218, a command processing program 220 and an initialization program 229.

The RAM 205 includes a system information region 222, a disk control information region 223, an FC-AL control information region 224, a host management information region 225, an LU management information region 226 and a command queue 228.

The real time OS 213 manages a task scheduling, resources such as memories, interruption and timers. The system information region 222 is a region that is used by the real time OS 213 and is used for storing task control information and a program stack.

The FC-AL control program 214 is a driver that controls the Fiber Channel controller 202 and executes a link control between the Fibre Channel Port and the Fibre Channel Ports of the disk storage apparatus 103, management of the address on the Loop 232a, 232b of the hard disk drive 103, data flow control between the Fibre Channel controller 202 and the drive cache 206, SCSI command reception control and response transmission to the SCSI command. The FC-AL control information region 224 is a region that stores the addresses on the WWN 302e and Loop 232a of the Fibre Channel Port 211a and the addresses on the WWN 302f and Loop 232b of the Fibre Channel Port 211b.

The disk control Program 215 is a driver that is used to gain access to the data of the disk drive 250 and is a program for controlling the disk formatter 207 and the data flow between the disk drive 250 and the drive cache 206. The disk control information region 223 stores the information inherent to the disk drive 250 such as the number of disks of the disk drive 250, the number of heads, the information of the data format of the disk drive 250, defective region information, replacement region and replacement information, error recovery information, and so forth.

The host management program 216 stores the communication environment information that is inherent between the Fibre Channel Ports 211a, 211b of the host computers 301a, 301b and the Fibre Channel Ports of the disk storage apparatus 103 in the host management information region 225 in the correspondence relation with the WWN 302a to 302d of the Fibre Channel Ports of the host computers 301a, 301b and manages such information.

The LU management program 217 is a program that manages the logical units inside the hard disk drive 103. The LU management program 217 manages the physical position and the capacity of each logical unit inside the hard disk drive 103. It also manages exclusively the logical units inside the hard disk drive 103 for the host computers 301a and 301b. The LU management program 217 includes a logical unit number conversion program 230 and a logical unit correspondence setting program 231 as will be explained later in further detail. The LU management information region 226 is a region used by the LU management program 217. The physical position and the capacity of each logical unit inside the disk drive are stored in this region 226. It also includes the logical unit number conversion table 102 as will be explained later in detail.

The command queue management program 219 is a program for storing the SCSI command received from the host computers 301a, 301b in the command queue 228 and for dequeuing the SCSI command transmitting the response. It also schedules the execution sequence of the SCSI commands stored.

The cache management program 218 is a program that stores the Logical Block (LBA) of the data stored in the drive cache 206, the data length (block length), and the address inside the drive cache 206 in association with one another in the cache management information region 227. It manages the data in the drive cache 206 and its empty region. Furthermore, it judges whether or not the data is stored in the drive cache 206 from the LBA and the block length indicated by the SCSI command.

The address conversion program 220 is a program that converts the LBA indicated by the SCSI command to the physical address of the cylinder number, the head number and the sector number of the disk drive 250. It also converts the block length indicated by the SCSI command to the sector number of the disk drive 250. When converting, the address conversion program 220 looks up the information inherent to the disk drive 250 stored in the disk control information region 223.

The command processing program 221 is a program that interprets and executes the SCSI command received from the host computers 301a and 301b. The command processing program 221 calls the FC-AL control program 214, the disk control program 215 and the cache management program 218 in accordance with the command so interpreted, operates them and executes the SCSI command.

The initialization program 229 is a program that is executed at the time of making of power and resetting of the system, and initializes the disk control portion 201 as a whole inclusive of the initialization of the RAM 205.

The disk control program, as described above, comprises the host interface control program, the host management program, the logical unit management program, the address conversion program, the command processing program, the drive cache, the drive cache control program, the drive control portion and the data bus as described above.

In this embodiment, the host interface control portion comprises the Fibre Channel controller 202, the hardware of the CPU 203, the FC-AL control program 214 stored in the ROM 204 and the FC-AL control information region 224 of the RAM 205. The host management portion comprises the CPU 203, the host management program 216, and the host management information region 225. The logical unit management portion comprises the CPU 203, the LU management program 217, and the host management information region 225. The address conversion portion comprises the CPU 203, the address conversion program 220 and the disk control information region 223. The command processing portion comprises the CPU 203, the programs of the ROM 204, and the RAM 205. The drive cache control portion comprises the CPU 203, the cache management program 218 and the cache management information region 227. The drive control portion comprises the disk formatter 207, the drive control circuit 208, the hardware of the CPU 203, the disk control program 215 and the disk control information region 223.

The logical unit correspondence memory portion comprises the logical unit number conversion table 102 inside the RAM 205, and the logical unit correspondence setting portion comprises the mode select command of the SCSI, the CPU 203 and the logical unit correspondence setting program 231. The logical unit number conversion portion comprises the CPU 203 and the logical unit number conversion program 230.

Figure 1:
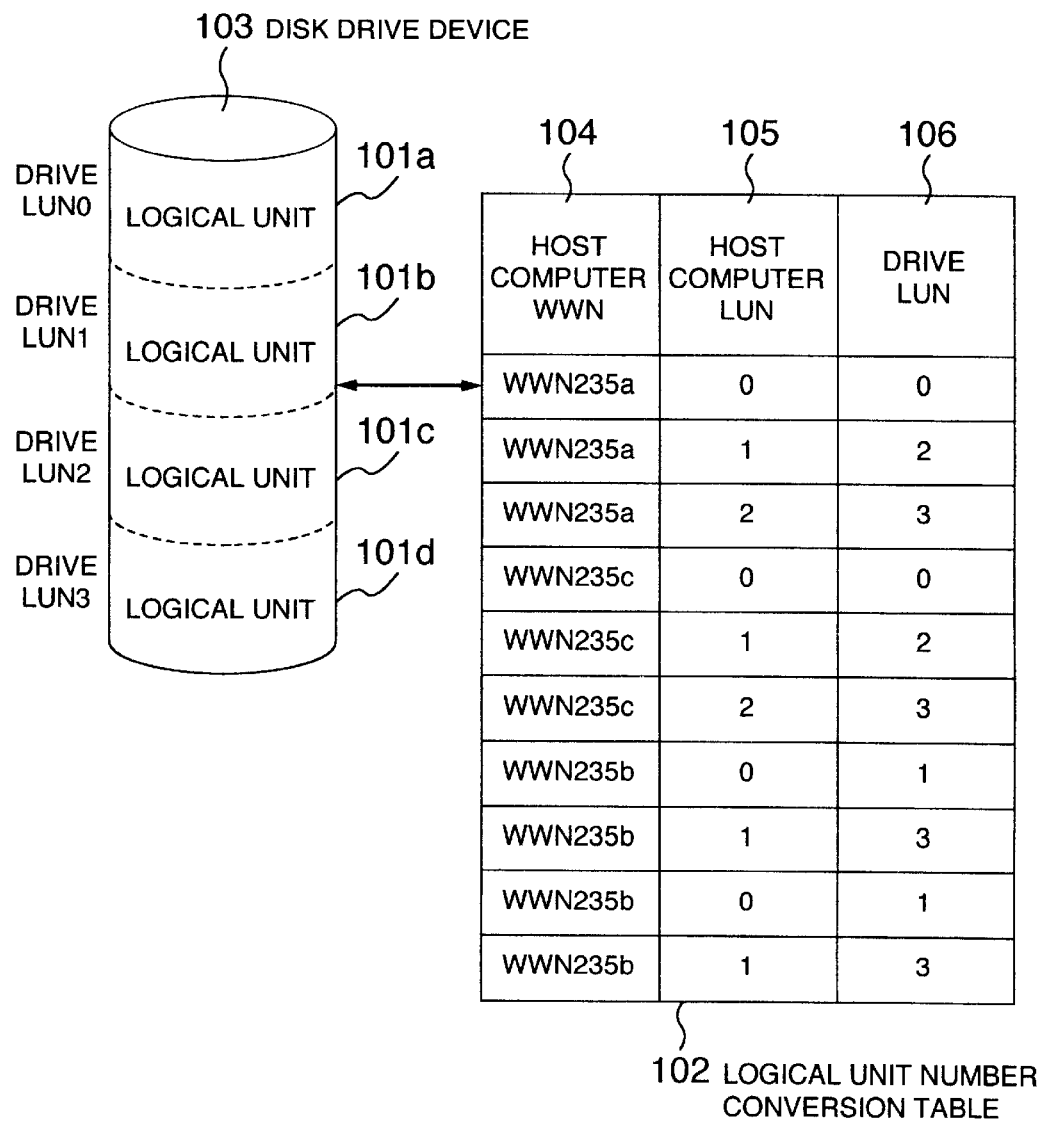
FIG. 1 shows the structure of a logical unit of a disk storage apparatus according to one embodiment of the present invention and a table format of a logical unit number conversion table.

FIG. 1 shows the logical unit structure of the disk storage apparatus 103 and the table format of the logical unit number conversion table 102 in the first embodiment of the present invention. In this embodiment, the disk storage apparatus 103 includes four logical units 101a, 101b, 101c and 101d.

This embodiment will be explained about the following case, by way of example. In other words, the logical units 101a and 101c in this embodiment are the logical units that store the information inherent to the host computer 301a. The logical unit 101b is the one that stores the information inherent to the host computer 301b. The logical unit 101d is the one that is shared by the host computers 301a and 301b.

The host computer 301a allots therein 0 to the logical unit 101a, 1 to the logical unit 101b and 2 to the logical unit 101d, and gains access to them. The host computer 301b allots therein the number 0 to the logical unit 101c and the number 1 to the logical unit 101d, and gains access to them.

On the other hand, the disk storage apparatus 103 serially allots therein the numbers 0, 1, 2 and 3 from the logical unit 101a and manages the logical units 101a to 101d.

The logical unit number conversion table 102 has the region of the host computer WWN 104 for storing the WWN 235a to 235c of the Fibre Channel Ports of the host computers 301a and 301b, the host computer LUN (Logical Unit Number) 105 for storing the numbers that allow the host computers 301a and 301b to manage therein the logical units, and the region of the drive LUN 106 for storing the numbers that allow the disk storage apparatus 103 to manage therein the logical units 101a to 101d.

The process for setting and registering the correspondence between the numbers allotted by the host computers 301a, 301b to the logical units 101a, 101b and the numbers allotted by the disk storage apparatus 103 to the logical units 101a to 101d for managing them will be described later. However, the logical unit number 0 of the host computer 301a, WWN of the Fibre Channel Port of which is WWN 302a, is associated with the logical unit number 0 inside the disk storage apparatus 103. The logical number 1 of the host computer 301a is associated with the logical unit number 2 inside the disk storage apparatus 103. Similarly, the logical unit number 0 of the host computer 301b, WWN of the Fibre Channel Port of which is WWN 235b, is associated with the logical unit number 1 of the disk storage apparatus 103, and is store in the logical unit number conversion table 102. The logical unit number 2 of the host computer 301a and the logical unit number 1 of the host computer 301b are associated with the logical unit number 3 of the disk storage apparatus 103 and are stored in the logical unit number conversion table 102.

The address of host computer WWN 104 and the logical unit number of host computer LUN 105 are supplied to the logical unit number conversion program 230 from which data "drive LUN" and data "LUN error" are outputted.

Figure 4:
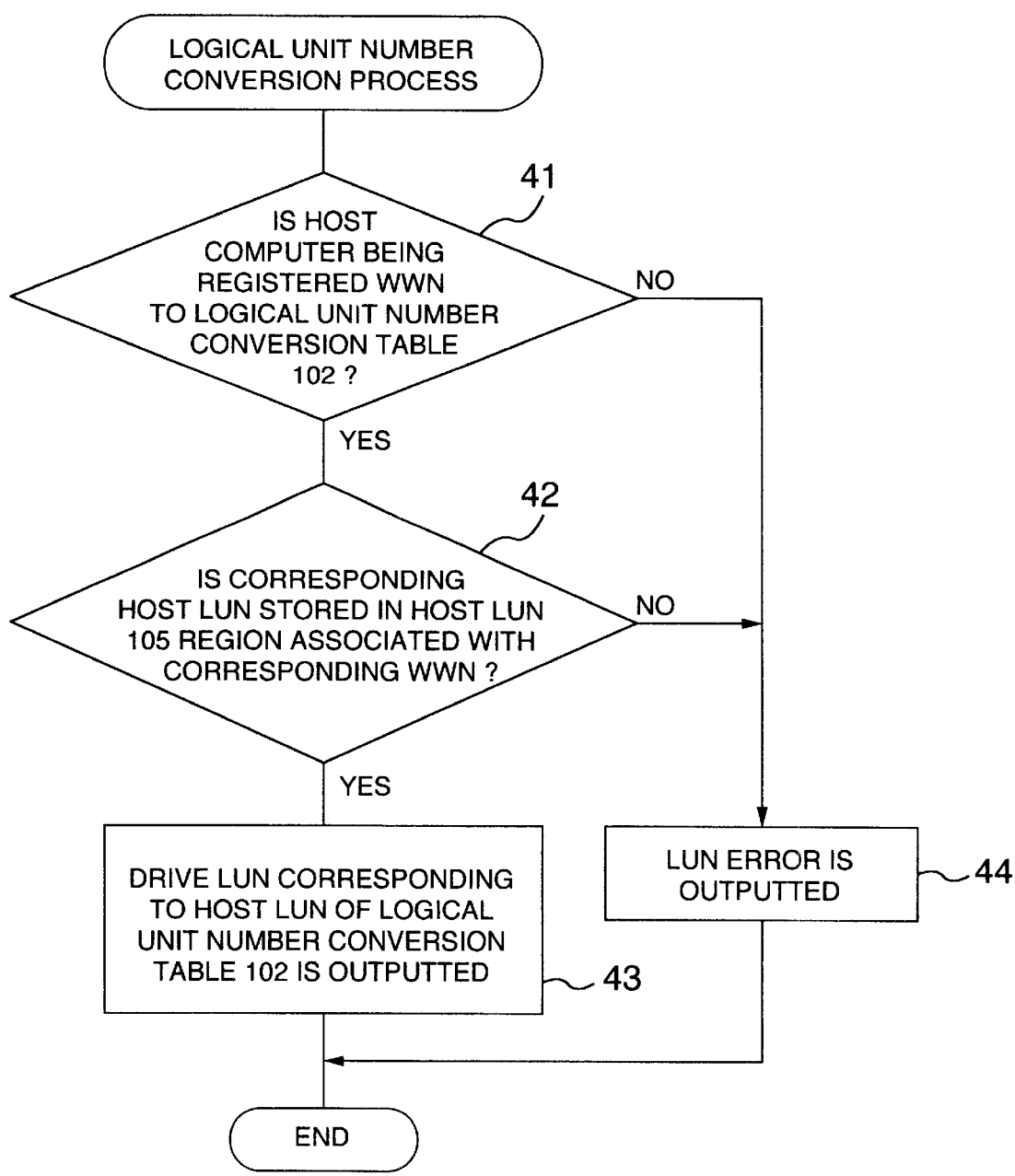
FIG. 4 is a flowchart of a conversion process by which a logical unit number conversion portion in the first embodiment of the present invention converts a logical unit number designated from a host computer for each SCSI command to a logical unit number allotted to a logical unit inside the disk storage apparatus.

FIG. 4 is a flowchart of the conversion process for converting the logical unit number (host LUN) indicated by the host computer 301a, 301b for each command to the number (drive LUN) for managing the logical units inside the disk storage apparatus 103. When called, the logical unit number conversion program 230 serially executes the following processes.

(1) Identification of Host Computer 301a, 301b

In steps 41 and 42, whether or not the inputted WWN is stored in the host computer WWN 104 region of the logical unit number conversion table 102 is confirmed, and the host computers 301a and 301b are thus identified. When it is found stored, the process (2) that will be described next is executed on the premise that the host computers are identified. If it is not stored, the LUN error is outputted and the flow returns to the calling end. For example, if WWN of WWN 235a, WWN 235b, WWN 235c and WWN 235d are stored in the host computer WWN 104 region, the host computers 301a and 301b having the Fibre Channel Ports of the corresponding WWN can be identified, and the process (2) is executed. When the WWN other than those described above are inputted, the LUN error is outputted and the flow returns to the calling end.

(2) Conversion of Inputted Host Computer LUN

Whether or not the inputted host computer. LUN is stored in the host computer LUN 105 associated with the corresponding WWN of the logical unit number conversion table 102 is confirmed. When it is stored, the drive LUN 106 corresponding to this host computer LUN is outputted in step 43 and then the flow returns to the calling end. When the host computer LUN is not stored in the host computer LUN 105 region of the logical unit number conversion table 102, the LUN error is outputted and the flow returns to the calling end. When the inputted WWN is WWN 302a and the host computer LUN is 0, for example, the drive LUN 0 is outputted and the flow returns to the calling end. When the inputted WWN is WWN 302a and the host computer LUN is 4, the LUN error is outputted and the flow returns to the calling end.

Next, the flow of the process of the SCSI command, that the disk storage apparatus 103 receives from the host computer 301a, 301b, will be explained, and the process for exclusively managing the logical units 101a to 101d by the LU management program 217 will be also explained.

Figure 5:
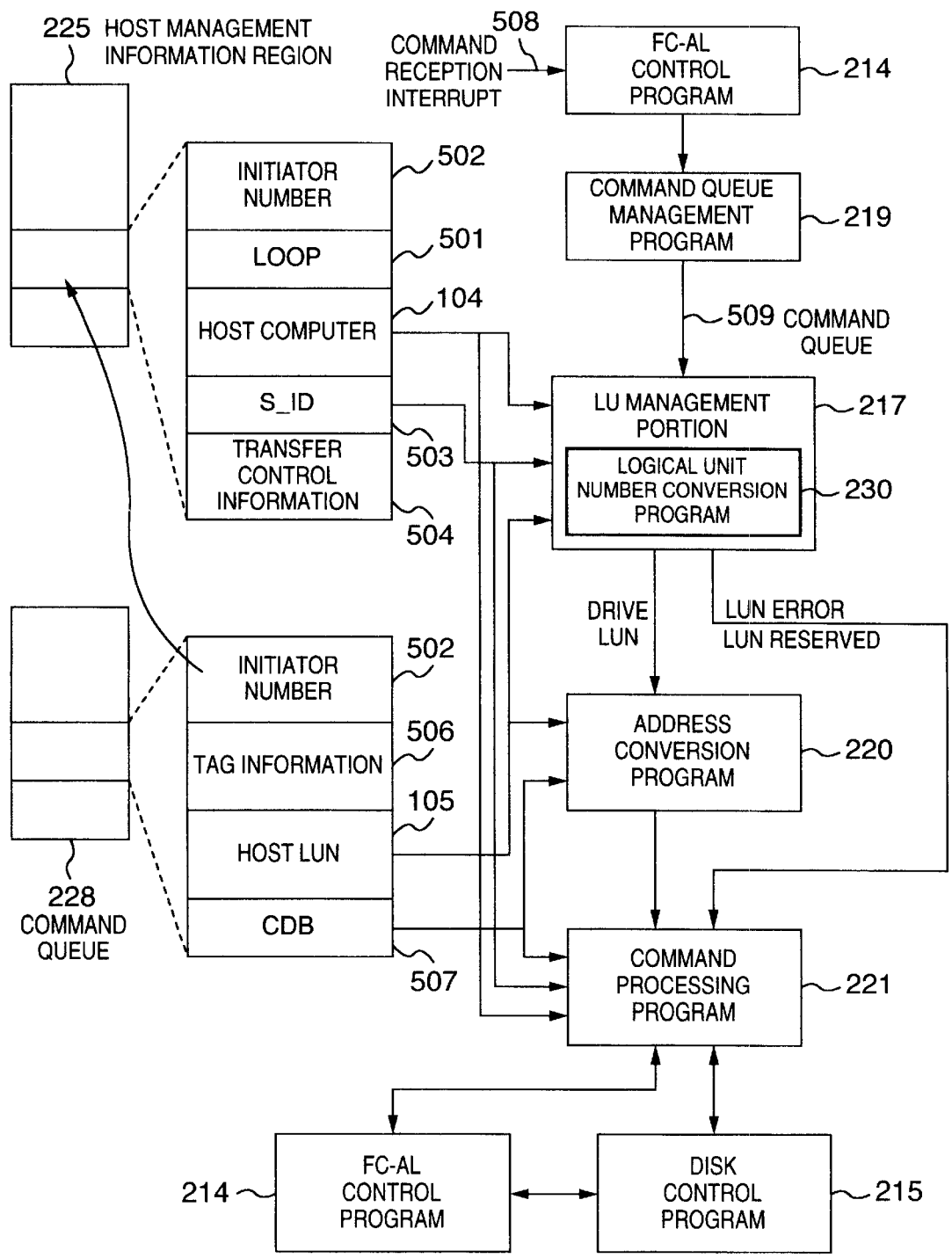
FIG. 5 show a flowchart of a process by which the disk storage apparatus in the first embodiment of the present invention executes the SCSI command received from a host computer.

FIG. 5 is a flowchart showing the flow of the program inside the ROM 204 of the CPU 203 when the disk storage apparatus 103 executes the SCSI command received from the host computers 301a, 301b.

In the FC-AL, N-Port Login and Process Login, is be executed prior to the execution of the SCSI command so that the Fibre Channel Port of the host computer 301a, 301b and the Fibre Channel Port of the disk storage apparatus 103 exchange the information about the mutual communication environment, and to constitute an image pair. Each of N-Port Login and Process Login means a Link Service defined by a Fibre Channel Specification, which is used for a communication environment setting process between Fibre Channel Ports referred to as Login process. At this time, the WWN 304 of the Fibre Channel Ports of the host computer 301a, 301b and the disk storage apparatus 103 are reported to each other. The disk storage apparatus 103 stores the information of this communication environment and the image pair in the host management information region 225.

In this embodiment, the host management information region 225 has the regions that can store the management information of sixteen different host computers. The individual regions store the initiator number 502, the loop 501, the host computer WWN 104, $S_{13}$ 503 and the transfer control information 504.

The initiator number 502 represents the numbers of 0 to 15 allotted to the corresponding host computer 301, inside the disk storage apparatus 103 when N-Port Login and Process Login are executed to constitute the image pair. The Loop 501 is the value that represents the loop to which the corresponding host computer 301a, 301b is connected. When the Fibre Channel Port of the corresponding host computer 301a, 301b is connected to the Loop 232a, 0 is stored, and when it is connected to the Loop 232b, 1 is stored. S_ID 503 is an address of the Fibre Channel Port of the corresponding host computer 301a, 301b on the FC-AL. The transfer control information 504 is the control information necessary for the data transfer such as the receivable maximum frame length of the corresponding host computer 301a, 301b.

Receiving the SCSI command from the host computer 301a, 301b, the Fibre Channel controller 202 causes the CPU 203 to generate the SCSI command reception interrupt 508.

The SCSI command so received is stored in the command queue 228. In this embodiment, the command queue 228 has a region that can store 128 SCSI commands. A CDB (Command Descripter Block) 507 of the SCSI command is stored in the individual region in association with the initiator number 502, the tag information 506 and the host LUN 105. The tag information 506 represents the kind of the tag indicated for each SCSI command and the two-byte tag number.

When the SCSI command reception interrupt 508 occurs, the FC-AL control program 214 is called. The FC-AL control program 214 stores the CDB 507 of the SCSI command so received in the command queue 228 together with the initiator number 502, the tag information 506 and the host LUN 105 of the corresponding host computer 301a, 301b, and then returns to the original state.

When the SCSI command is stored in the command queue 228, the internal event of the program occurs, and the real time OS 213 calls the command queue management program 219. The command queue management program 219 looks up the tag information 506, schedules the SCSI command stored in the command queue 228, selects the SCSI command to be executed, and outputs the corresponding command queue number 509 and returns to the original state. The command queue number 509 is a number that relatively represents the position at which the corresponding SCSI command is stored in the command queue 228. When the command queue number 509 is outputted, the internal event of the program occurs, and the real time OS 213 calls the LU management program 217.

The LU management program 217 manages exclusively the logical units in the following two systems.

(1) Exclusive Management of Logical Units by Internal Mechanism of Disk Storage Apparatus 103

The LU management program 217 calls the logical unit number conversion program 230 and tries to convert the host LUN 105 associated with the SCSI command at the position inside the command queue 228, that is indicated by the command queue number 509, to the drive LUN 106. The LU management program 217 delivers the host computer WWN 104 and the host LUN 105 as the input to the logical unit number conversion program 230. At this time, the LU management program 217 looks up the command queue 228 and the host management information region 225. It then acquires the host computer WWN 104 corresponding to the initiator number 502 that is associated with the SCSI command at the position indicated by the command queue number 509. If the output of the logical unit number conversion program 230 is the LUN error, the LUN management program 217 outputs the LUN error and returns to the original state.

(2) Exclusive Management of Logical Units by SCSI Command

When the output of the logical unit number conversion program 230 is the drive LUN 106, whether or not the corresponding host computer 301a, 301b is authorized to access to the drive LUN 106 is judged from the Reserve condition and the Persistent Reserve condition of the corresponding drive LUN 106. If the host computer 301a, 301b is found authorized to access to the drive LUN 106 as a result of this judgement, the UL management program 217 outputs the drive LUN 106 and returns to the original state. If the host computer 301a, 301b is not found authorized to access to the drive LUN 106, the LU management program 217 outputs Reservation Conflict and returns to the original state.

When the output of the LU management program 217 is the LUN error or the Reserve Conflict, the command processing program 221 is called. The error response of the SCSI command is transmitted to the host computer 301a, 301b through the FC-AL control program 214 to complete execution of the SCSI command. Then, the process returns to the original state. When the output of the LU management program 217 is the drive LUN 106, the command processing program 221 calls the address conversion program 220 if this SCSI command is the one that makes access to the disk drive 250 such as Read, Write, Seek, and so forth. In this case, the address conversion program 220 converts the LBA inside the CDB 507 of the SCSI command to the physical address of the disk drive 250 such as the cylinder number, the head number and the sector number. It also converts the Block Length inside the CDB 507 to the sector number of the disk drive 250. Furthermore, the command processing program 221 calls other FC-AL control program 214 and the disk control program 215 and executes the data transfer between the host computer 301a, 301b and the disk drive 250 and the response transmission to this SCSI command. After the execution of the SCSI is completed, the command processing program 221 returns to the original state.

After the execution of the SCSI command is completed, the internal event in the program occurs, and the real time OS 213 calls the command queue management program 219. The command queue management program 219 dequeues the SCSI the execution of which is completed.

Next, the explanation will be given on the process for setting and storing the correspondence between the number allotted to the logical units by and inside the host computer 301a, 301b and the number allotted to the logical units by and inside the disk storage apparatus 103, into the logical unit number conversion table 102. The host computer 301a, 301b reports by the Mode Select command of the SCSI the number allotted to the logical unit inherent to the host computer 301a, 301b and the number allotted to the logical unit shared by other host computer 301a, 301b, to the disk storage apparatus 103.

FIG. 6 shows the page format of the page parameters for notifying the number allotted to the logical unit by and inside the host computer 301a, 301b by the Mode Select command. The parameter page comprises a 6-bit page code 601, a 1-byte page length 602, a port number 607, a 1-byte exclusive logical unit number 603, a 1-byte shared logical unit number 604, an 8-byte exclusive logical unit number 605 and an 8-byte shared logical unit number 606. The parameters are arranged in the format shown in FIG. 6. The dedicated logical unit number 605 has the 8-byte unit and exists in the number corresponding to the dedicated logical unit number 603. The shared logical unit number 606 has the 8-byte unit and has the region corresponding to the value stored in the shared logical unit number 604. The page code 601 is a code that represents the page of the Mode Select command, and is 0×23 in this embodiment. The page length 602 represents a length of the page in the byte unit. The dedicated logical unit number 603 represents a number of the logical units that store the information inherent to the host computers 301a and 301b. The shared logical unit number 604 represents a number of the logical units that are shared by a plurality of host computers 301a and 301b. The dedicated logical unit number 605 represents the number allotted internally by the host computer 301a, 301b to the logical units storing the information inherent to the host computer 301a, 301b. The shared logical unit number 606 represents the number allotted internally to the logical units that are shared by a plurality of host computers 301a, 301b.

FIG. 7 shows the page parameters that are transmitted by the host computer 301a from the port of WWN 302a to the disk storage apparatus 103 by the Mode select command. In this embodiment, since the host computer 301a generates two logical units for storing the inherent information, the dedicated logical unit number 603 is 0×02. The host computer 301a allots internally the numbers 0 and 1 to these two logical units. Therefore, the dedicated logical unit 605a is 0×00 and the dedicated logical unit number 605b is 0×01. Since one logical unit shared by a plurality of host computers 301a and 301b is generated, the shared logical unit number 604 is 0×01. The shared logical unit number 606 is 0×02.

When the disk storage apparatus 103 is used for the first time, the host computer 301a transmits the page parameters of the Mode Select command for each port to the disk storage apparatus 103.

The explanation will be given on the operations of the command processing program 221 (FIG. 5) and the logical unit number correspondence setting program 231 (FIG. 2) when the disk storage apparatus 103 receives the Mode Select command. The process flow from the reception of the Mode Select command to the storage in the command queue 228 is the same way as the flow of the program inside the ROM 204 of the CPU 203 when the SCSI command is executed that is described already. When the Mode Select command is stored in the command queue 228, the internal event of the program occurs and the real time OS 213 calls the command processing program 221. The command processing program 221 calls in turn the FC-AL control program 214 and receives the page parameter. Next, the command processing program 221 calls the logical unit number correspondence setting program 231. The logical unit number correspondence setting program 231 associates the dedicated logical unit number 605 of the page parameter with the number of the logical units 101a to 101d among the internal logical units 101a to 101d to which access cannot be made from any host computers 301a to 301b. This setting program 231 then sets the dedicated logical unit number 605 to the logical unit number conversion table 102. In this embodiment, the Mode Select command is transmitted from the Fibre Channel Port, WWN of the host computer 301a of which is WWN 302a. Therefore, WWN 302a, 0×0 of the dedicated logical unit number 605a, and 0×00 allotted to the logical unit inside the disk storage apparatus 103, are associated and are set to the logical unit number conversion table 102.

At the time of making of power, the host computer 301a recognizes the disk storage apparatus and the logical unit number for every two Fibre Channel Ports. Therefore, the number is serially designated from the logical unit number 0 and the Inquiry command of the SCSI is transmitted. The disk storage apparatus 103 reports that the logical units having the designated logical unit numbers of 0 to 2 exist in the response to the Inquiry command, and reports also that the corresponding logical unit does not exist to the Inquiry command that inquires for the logical unit number of 3 or more. The host computer 301*b* serially designates the logical unit numbers from 0 to the disk storage apparatus 103 for every two Fibre Channel Ports and transmits the Inquiry command. The disk storage apparatus 103 reports that the logical units exist for the designated logical unit numbers of 0 and 1, in the response to the Inquiry command. It reports also that the logical units having the logical unit numbers of 2 or more do not exists in the response to the Inquiry command that inquires such logical unit numbers.

In the first embodiment of the present invention described above, the logical unit correspondence setting program 231 can allot those logical units which are shared by a plurality of host computers 301*a*, 301*b* and those logical units which store the information inherent to the host computers 301*a*, 301*b* having high access frequency, to the high-speed logical units inside the disk storage apparatus 103. It can execute, at the high speed, the requirements for the logical units shared by a plurality of host computers 301*a*, 301*b* and for the logical units storing the information inherent to the host computers 301*a*, 301*b* having high access frequency. The high-speed logical unit inside the disk storage apparatus 103 is, for example, the logical unit the physical position of which exists round the outer periphery of the hard disk drive.

Figure 8:
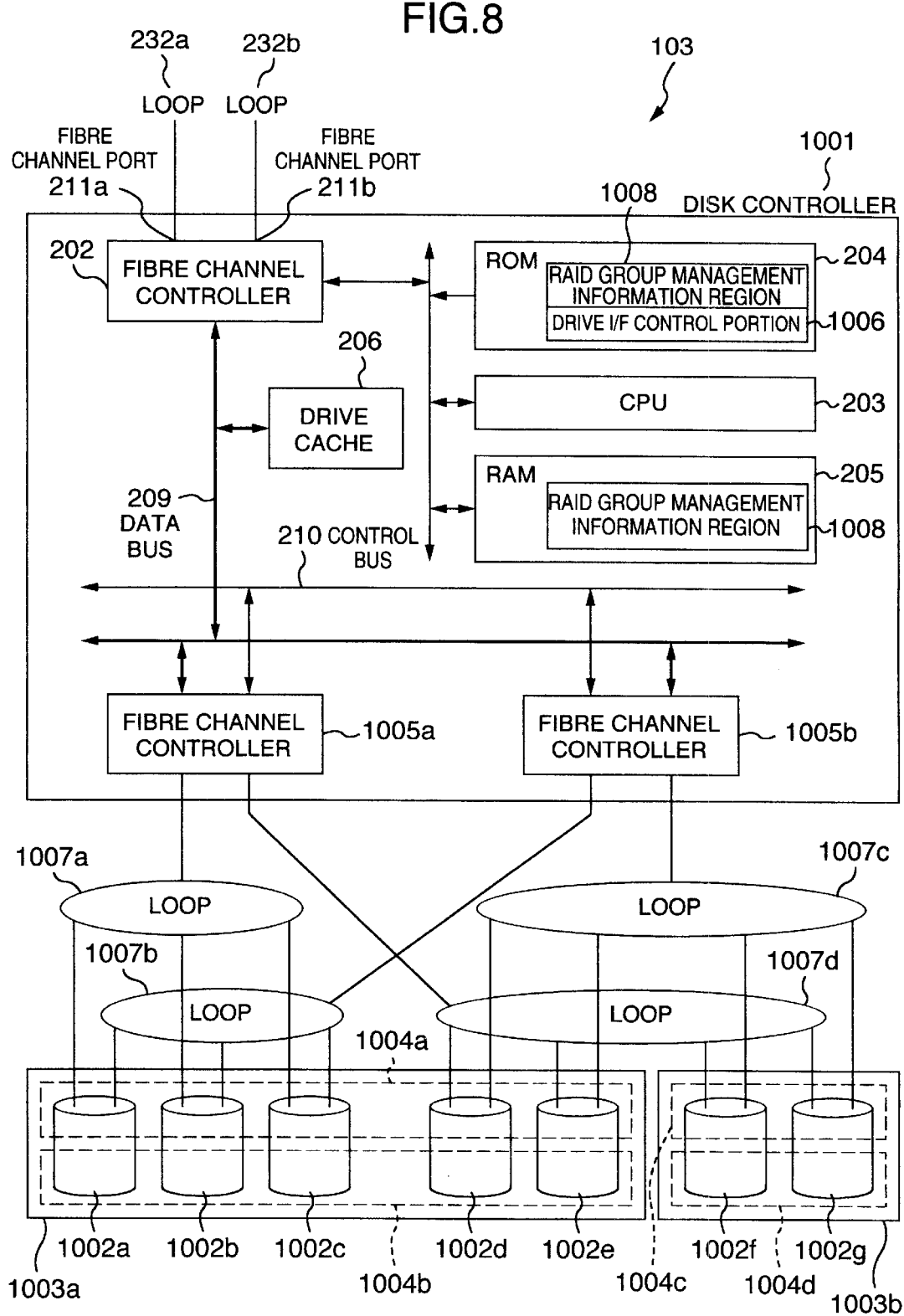
FIG. 8 shows an internal structure of a disk storage apparatus according to the second embodiment of the present invention.

The second embodiment of the present invention will be explained with reference to FIGS. 3, 8 and 9. The second embodiment represents the application of the present invention to a disk array. The disk storage apparatus 103 shown in FIG. 3 is a disk array in this embodiment. FIG. 8 shows the internal construction of the disk array 103 of the second embodiment of the present invention. The disk array 103 of this embodiment comprises a disk array controller 1001 and seven hard disk drives 1002*a*, 1002*b*, 1002*c*, 1002*d*, 1002*e*, 1002*f* and 1002*g*. The physical interface between the disk array controller 1001 and the hard disk drives 1002*a* to 1002*g* uses the Fibre Channel and their logical interface, the SCSI. The loop topology called "FC-AL" is used for the connection. Four FC-AL loops 1007*a*, 1007*b*, 1007*c*, 1007*d* are interposed between the disk array controller 1001 and the hard disk drives 1002*a* to 1002*g*. The disk array controller 1001 has Fibre Channel Ports 211*a* and 211*b* for the connection with the loops 232*a* and 232*b*. In addition, it has four Fibre Channel Ports besides the two channel ports 221 and 211*b*. Each of these Fibre Channel Ports is connected to a different loop 1007*a*, 1007*b*, 1007*c*, 1007*d*. The hard disk drives 1002*a*, 1002*b* and 1002*c* are connected to the loops 1007*a* and 1007*b*, and the hard disk drives 1002*d*, 1002*e*, 1002*f* and 1002*g* are connected to the loops 1007*c* and 1007*d*.

In this embodiment, the explanation will be given on the case where the disk storage apparatus 103 has an RAID group 1003*a* of an RAID 5 using five hard disk drives and an RAID group 1003*b* of an RAID 1 using two hard disk drives. The RAID group 1003*a* comprises hard disk drives 1002*a*, 1002*b*, 1002*c*, 1002*d* and 1002*e*, and the RAID group 1003*b* comprises R hard disks 1002*f* and 1002*g*. Generally, the RAID group 1003*a* having a greater number of hard disk drives 1002*a* to 1002*e*, that operate in parallel with one another, can be accessed at a higher speed than the RAID group 1003*b*. The disk storage apparatus 103 includes therein four logical units 1004*a*, 1004*b*, 1004*c* and 1004*d*. The logical units 1004*a*, and 1004*b* exist in the RAID group 1003*a*, and the logical units 1004*c* and 1004*d* exist in the RAID group 1003*b*. It will be assumed hereby that the logical units 1004*b* and 1004*c* have the same capacity. In this embodiment, the explanation will be also given about the case where the disk storage apparatus 103 allots the numbers 0, 1, 2 and 3 to the logical units 1004*a*, 1004*b*, 1004*c* and 1004*d*, respectively, and manages them inside it.

The difference of the hardware of the disk control portion 201 and the host computers 301*a* and 301*b* in the first embodiment from the disk array controller 1001 of this embodiment is that the disk array controller 1001 has two Fibre Channel controllers 1105*a* and 1005*b* in place of the drive control circuit 208, and the disk array controller 1001 executes the control of the hard disk drives 1002*a* to 1002*g* through the Fibre Channel interface and the data transfer between the disk array controller 1001 and the hard disk drives 1002*a* to 1002*g*. The difference of the programs executed by the CPU 203 is that a drive I/F control portion 1006 that controls the Fibre Channel controllers 1005*a* to 1005*b* for directly controlling the hard disk drives 1002*a* to 1002*g* and is contained in the ROM 204, and thus controls the hard disk drives 1002*a* to 1002*g* and the data flow between the disk array controller 1001 and the hard disk drives 1002*a* to 1002*g*. Also, the RAM 205 includes therein an RAID group management information storage region 1008. The RAID group management information storage region 1008 stores the information representing the RAID construction such as RAID 1 or RAID 5 for each RAID group 1003*a* to 1003*b*, the number of the hard disk drives 1002*a* to 1002*e* inside the RAID group 1003*a*, the information for identifying the hard disk drives 1002*f* to 1002*g* inside the RAID group 1003*a*, and the minimum unit of reading/writing the data by the hard disk drives 1002*a* to 1002*g*. The address conversion portion 1008 converts the request of the SCSI command transmitted by the host computers 103*a* and 103*b* to the command of the hard disk drives 1002*a* to 1002*g* by using the information stored in the RAID group management information region 1008.

The disk array controller 1001 includes the LU management program 217 inside the ROM 204 in the same way as in the first embodiment and includes further the logical unit number conversion program 230 and the logical unit correspondence setting program 231 inside the LU management program 217. The disk array controller 1001 includes further the LU management information region 226 inside the RAM 205 in the same way as in the first embodiment, and includes the logical unit number conversion table 102 inside the LU management information region 226. The operation of these LU management program 217, logical unit number conversion program 230 and logical unit correspondence setting program 231 are the same as those of the first embodiment.

Figure 9:
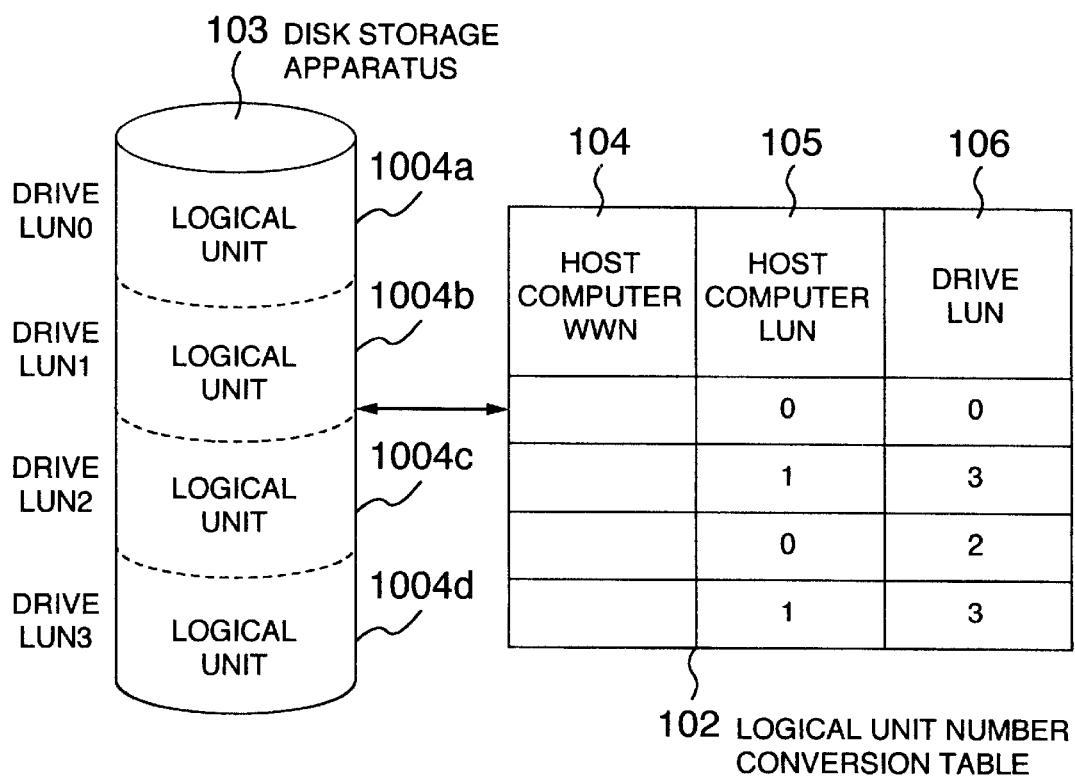
FIG. 9 shows the values stored in a logical unit number conversion table in the second embodiment of the present invention.

FIG. 9 shows the values that are stored in the logical unit number conversion table 102 in the second embodiment.

In this embodiment, the logical unit 1004*a*, is the one that stores the information inherent to the host computer 301*a*. The logical unit 1004*c* is the one that stores the information inherent to the host computer 301*b*. The logical unit 1004*d* is the one that is shared by the host computers 301*a* and 301*b*, and the logical unit 1004*b* is the one to which access cannot be made from both host computers 301*a* and 301*b*.

The host computer 301*a* allots the numbers 0 and 1 to the logical units 1004*a*, and 1004*dl*, respectively, and makes access to them. The host computer 301*b* allots the numbers 0 and 1 to the logical unit 1004*c* and 1004*d*, respectively, and makes access to them.

Inside the disk storage apparatus 103, on the other hand, the numbers 0, 1, 2 and 3 are allotted serially from the logical units 1004*a*, and these logical units are managed.

The logical unit number 0 inside the disk storage apparatus 103 is associated with the logical unit number 0 of the host computer 301a, WWN of the Fibre Channel Port of which is WWN 302a, and is stored in the logical unit number conversion table 102. The logical unit number 2 inside the disk storage apparatus 103 is associated with the logical unit number 0 of the host computer 301b, WWN of the Fibre Channel Port of which is WWN 302b, and is stored in the logical unit number conversion table 102. The logical unit number 3 inside the disk storage apparatus 103 is associated with the logical unit number 1 of the host computer 301a and with the logical unit number 1 of the host computer 301b, and is stored in the logical unit number conversion table 102. As to the logical unit 1004b, the disk storage apparatus 103 allots 1 to this unit and manages the same, but this number does not correspond to the logical unit number of both host computers 301a and 301b. Therefore, none of the host computers 301a and 301b can make access to this logical unit 1004b.

In this embodiment, the logical unit correspondence setting program 231 changes the logical unit number inside the disk storage apparatus 103, that corresponds to the logical unit number 0 of the host computer 301b, for example, in the logical unit number conversion table 102 from 0 to 1. In this way, setting of the logical unit 1004b, to which access cannot be made from both host computers 301a and 301b, can be changed to the logical unit for storing the information inherent to the host computer 301b.

The logical unit correspondence setting program 231 monitors the frequency of access to the logical unit 1004c, and copies the data stored in the logical unit 1004c into the high-speed logical unit 1004b having the same capacity when the access frequency exceeds a certain threshold value, or when any trouble occurs in either one of the hard disk drives 1002f and 1002g and reliability of the RAID group 1003b is therefore likely to drop. The logical unit correspondence setting program 231 changes the logical unit number from 0 to 1 so that the operation speed of the logical unit storing the information inherent to the host computer 301b can be improved, without changing the logical unit management inside the host computer 301. In addition, the drop of reliability can be prevented.

What is claimed is:

1. At least one disk storage apparatus having a plurality of logical units to be shared by a plurality of host computers, comprising:

logical unit number correspondence memory means that stores a correspondence between a logical unit number designated by said host computer and a logical unit number present in said disk storage apparatus;

logical unit number conversion means that converts said logical unit number designated by said host computer to said logical unit number present in said disk storage apparatus; and logical unit correspondence setting means that stores the correspondence between said logical unit number designated by said host computer and said logical unit number present in said disk storage apparatus in said logical unit number correspondence memory means.

2. A disk storage apparatus according to claim 1, wherein said logical unit number correspondence memory means stores an address inherent to said host computer, an identification code of said logical unit number managed by said host computer and said logical unit number present in said disk storage apparatus.

3. A disk storage apparatus according to claim 2, wherein said logical unit number conversion means confirms to address inputted from said host computer and the identification code and outputs the logical unit number corresponding to the identification code.

4. A disk storage apparatus according to claim 3, wherein said logical unit correspondence setting means corresponds said logical unit number specified by a page parameter transferred from said host computer with a logic unit number present in said disk storage apparatus, and sets the logical unit number to said logical unit number correspondence memory means.

5. A disk storage apparatus according to claim 4, wherein said logical unit correspondence setting means allots the logical unit of said disk storage apparatus shared by said plurality of host computers to one of said logical units capable of writing/reading at a high speed.

6. A disk storage apparatus according to claim 4, wherein said logical unit correspondence setting means allots the logical unit of said disk storage apparatus storing information inherent to said host computer and having a high access frequency, to one of said logical units capable of writing/reading at a high speed.

7. A disk storage apparatus according to claim 4, wherein said logical unit correspondence setting means changes a logical unit corresponding to a logical unit X designated by said host computer indicated on said logical unit number conversion means from X to Y, thereby allowing the change from the logical unit X prohibited to be accessed from an arbitrary host computer to the logical unit Y enabled to store inherent information for said host computer, where characters X and Y represent arbitrary logic units present in said disk storage apparatus.

8. A disk storage apparatus according to claim 7, wherein, said logical unit correspondence setting means instructs to copy a content of the logical unit X to another logical unit when a frequency of access from said host computer to the logical unit X exceeds a predetermined number of times, and changes a logical unit in said disk storage apparatus corresponding to the logical unit X designated by said host computer indicated on said logical unit number conversion means from X to Y, thereby storing the information inherent to said host computer in said logical unit Y, where characters X and Y represent arbitrary logical units present in said disk storage apparatus.

9. A disk storage apparatus according to claim 8, wherein, said logical unit correspondence setting means instructs to copy the content of the logical unit X to another logical unit when a fault occures in any of said disk storage appartuses, and changes a logical unit in said disk storage apparatus corresponding to the logical unit X designated by said host computer indicated on said logical unit number conversion means from X to Y, thereby storing the information inherent to said host computer in the logical unit Y, where characters X and Y represent arbitrary logical units present in said disk storage apparatus.

10. A disk storage apparatus according to claim 1, wherein the total number of said logical units in said disk storage apparatus is equal to, or greater than, the number of said host computers.

11. A disk storage apparatus according to claim 1, wherein said disk storage apparatus constitutes a disk array including a plurality of disk storage apparatuses.

12. A computer system including at least one disk storage apparatus having a plurality of logical units to be shared by a plurality of host computers, comprising:

a plurality of host computers managing individually logical units in said disk storage apparatus; and a plurality of disk storage apparatuses connected to a plurality of said host computers through a network;

each of said disk storage apparatuses including;

logical unit number correspondence memory means that stores a correspondence between a logical unit number designated by said host computer and the logical unit number of said disk storage apparatus;

logical unit number conversion means that converts the logical unit number designated by said host computer to the logical unit number of said disk storage apparatus; and logical unit number correspondence setting means that stores the correspondence between the logical unit number designated by said host computer and the logical unit number of said disk storage apparatus in said logical unit number correspondence memory means.

13. A computer system according to claim 12, wherein said disk storage apparatus constitutes a disk array including a plurality of said disk storage apparatuses.

* * * * *